United States Patent
Shetty et al.

(10) Patent No.: US 12,513,014 B2
(45) Date of Patent: Dec. 30, 2025

(54) SYSTEMS AND METHODS FOR TOKENIZING ASSETS VIA BLOCKCHAIN-TO-BLOCKCHAIN BRIDGE USING UNDERLYING ASSETS HELD AT A TRIPARTY AGENT OR CUSTODIAN

(71) Applicant: JPMORGAN CHASE BANK, N.A., New York, NY (US)

(72) Inventors: Suresh Shetty, Mangalore (IN); Sudhir Upadhyay, Edison, NJ (US); Manmeet Ahluwalia, Tampa, FL (US); Anthony Klausing, Chicago, IL (US); Ganesh Anantwar, Mumbai (IN); Sophia Wasserman, Manhattan, NY (US); Keerthi Moudgal, Brooklyn, NY (US); Chang Yang Jiao, New York, NY (US); Aditya Mayur Taday, Hoboken, NJ (US); Tyrone D Lobban, Loughton (GB); Nikhil Sharma, Kennedy Town (HK)

(73) Assignee: JPMORGAN CHASE BANK, N.A., New York, NY (US)

( * ) Notice: Subject to any disclaimer, the term of this patent is extended or adjusted under 35 U.S.C. 154(b) by 133 days.

(21) Appl. No.: 18/499,046

(22) Filed: Oct. 31, 2023

(65) Prior Publication Data
US 2024/0146554 A1    May 2, 2024

(51) Int. Cl.
*H04L 9/00* (2022.01)
*H04L 9/32* (2006.01)

(52) U.S. Cl.
CPC .............. *H04L 9/50* (2022.05); *H04L 9/3239* (2013.01); *H04L 9/3247* (2013.01)

(58) Field of Classification Search
CPC ........ H04L 9/50; H04L 9/3247; H04L 9/3239
(Continued)

(56) References Cited

U.S. PATENT DOCUMENTS 9,679,276 B1 *  6/2017  Cuende .............. G06Q 20/3827
10,600,050 B1 *  3/2020  Anton ....................... H04L 9/50
(Continued)

OTHER PUBLICATIONS

International Search Report and Written Opinion of the International Searching Authority, dated Jan. 29, 2024, from corresponding International Application No. PCT/US2023/078316.

*Primary Examiner* — Samson B Lemma
(74) *Attorney, Agent, or Firm* — GREENBERG TRAURIG LLP

(57) ABSTRACT

A method for tokenizing assets via a blockchain-to-blockchain bridge may include: receiving a first instruction from a client to mint first tokens for a client asset; encumbering the client asset on a custody ledger; creating a balance of the first tokens on a first distributed ledger; receiving a second instruction to lock and mint the first tokens to a second distributed ledger as second tokens; receiving verification from a custodian that the first tokens are locked on a lock ledger for the custodian; instructing a blockchain bridge computer program to mint second tokens to a client address on the second distributed ledger; receiving a third instruction to return the second tokens to the first distributed ledger; executing a public burn of the second tokens on the second distributed ledger; and instructing the custodian to unlock the first tokens and move the first tokens to the first distributed ledger.

18 Claims, 3 Drawing Sheets

(58) Field of Classification Search
USPC .......................................................... 713/168
See application file for complete search history.

(56) References Cited

U.S. PATENT DOCUMENTS

| | | | |
|---|---|---|---|
| 10,929,842 B1* | 2/2021 | Arvanaghi | H04L 9/3239 |
| 11,200,569 B1* | 12/2021 | James | G06Q 20/381 |
| 11,621,973 B2* | 4/2023 | Mylrea | G06F 21/602 |
| | | | 726/25 |
| 11,729,175 B2* | 8/2023 | Haque | G06F 21/604 |
| | | | 726/1 |
| 2017/0250815 A1* | 8/2017 | Cuende | G06Q 20/401 |
| 2019/0172026 A1* | 6/2019 | Vessenes | G06Q 20/065 |
| 2022/0173893 A1* | 6/2022 | Basu | H04L 9/3247 |
| 2022/0215469 A1* | 7/2022 | Jette | G06F 9/45558 |
| 2022/0230240 A1* | 7/2022 | Sliwka | G06Q 20/065 |
| 2022/0253842 A1* | 8/2022 | James | H04L 9/50 |
| 2023/0283489 A1* | 9/2023 | Lupowitz | H04L 9/3213 |
| | | | 713/159 |
| 2023/0308285 A1* | 9/2023 | Grover | G06F 21/6218 |
| 2023/0353531 A1* | 11/2023 | Khan | H04L 9/3239 |
| 2023/0370269 A1* | 11/2023 | Thai | H04L 9/3218 |
| 2024/0013195 A1* | 1/2024 | Osborn | G06Q 30/018 |
| 2024/0291651 A1* | 8/2024 | Fürstner | H04L 9/088 |

\* cited by examiner

SYSTEMS AND METHODS FOR TOKENIZING ASSETS VIA BLOCKCHAIN-TO-BLOCKCHAIN BRIDGE USING UNDERLYING ASSETS HELD AT A TRIPARTY AGENT OR CUSTODIAN

RELATED APPLICATIONS

This application claims the benefit of, and priority to, Indian Patent Application No. 202211062711, filed Nov. 2, 2022, the disclosure of which is hereby incorporated, by reference, in its entirety.

BACKGROUND OF THE INVENTION

1. Field of the Invention

Embodiments relate to systems and methods for tokenizing assets via blockchain-to-blockchain bridge using underlying assets held at a triparty agent or custodian.

2. Description of the Related Art

Representing regular-way assets in traditional finance on blockchain networks in a safe, compliant manner presents challenges. For example, there are issues in ensuring that underlying assets held at a triparty agent or custodian correctly match the asset tokens issued and maintained on a blockchain platform, ensuring that tokenized assets can be interoperable across different blockchains, etc.

SUMMARY OF THE INVENTION

Systems and methods for tokenizing assets via blockchain-to-blockchain bridge using underlying assets held at a triparty agent or custodian are disclosed. In one embodiment, a method for tokenizing assets via a blockchain-to-blockchain bridge using underlying assets held at a triparty agent or custodian may include: (1) receiving, at a tokenization agent computer program, a first instruction from a client computer program to mint first tokens for a client asset; (2) encumbering, by the tokenization agent computer program, the client asset on a custody ledger; (3) creating, by the tokenization agent computer program, a balance of the first tokens for the client asset on a first distributed ledger; (4) receiving, by the tokenization agent computer program, a second instruction to lock and mint the first tokens to a second distributed ledger as second tokens; (5) receiving, by the tokenization agent computer program, verification from a custodian or triparty agent that the first tokens are locked on a lock ledger for the custodian or triparty agent; (6) instructing, by the tokenization agent computer program, a blockchain bridge computer program to mint second tokens to a client address on the second distributed ledger; (7) receiving, by the tokenization agent computer program, a third instruction to return the second tokens to the first distributed ledger; (8) executing, by the tokenization agent computer program, a public burn of the second tokens on the second distributed ledger; and (9) instructing, by the tokenization agent computer program, the custodian or triparty agent to unlock the first tokens and move the first tokens to the first distributed ledger.

In one embodiment, the method may also include: receiving, by the tokenization agent computer program, a request to redeem the first tokens; and executing, by the tokenization agent computer program, a public burn and redeem of the first tokens.

In one embodiment, the first instruction, the second instruction, and/or the third instruction are signed with a first private client key.

In one embodiment, the balance of first tokens may be created with a first tokenization agent private key.

In one embodiment, the instruction to mint second tokens, the instruction to unlock, and/or the public burn and redeem are signed with a second tokenization agent private key.

In one embodiment, the client computer program performs actions with the second tokens on the second distributed ledger with a second client private key.

According to another embodiment, a system may include: a client electronic device executing a client computer program; a custody ledger; a custody or triparty agent comprising a lock ledger; a first distributed ledger; a second distributed ledger; a blockchain bridge computer program in communication with the first distributed ledger, and the second distributed ledger; and a tokenization agent computer program that is configured to receive a first instruction from the client computer program to mint first tokens for a client asset, to encumber the client asset on the custody ledger, to create a balance of the first tokens for the client asset on a first distributed ledger, to receive a second instruction to lock and mint the first tokens to a second distributed ledger as second tokens, to receive verification from the custodian or triparty agent that the first tokens are locked on the lock ledger, to instruct the blockchain bridge computer program to mint second tokens to a client address on the second distributed ledger, to receive a third instruction to return the second tokens to the first distributed ledger, to execute a public burn of the second tokens on the second distributed ledger, and to instruct the custodian or triparty agent to unlock the first tokens and move the first tokens to the first distributed ledger.

In one embodiment, the tokenization agent computer program may be further configured to request a redeem the first tokens to execute a public burn and redeem of the first tokens.

In one embodiment, the first instruction, the second instruction, and/or the third instruction are signed with a first private client key.

In one embodiment, the balance of first tokens may be created with a first tokenization agent private key.

In one embodiment, the instruction to mint second tokens, the instruction to unlock, and/or the public burn and redeem are signed with a second tokenization agent private key.

In one embodiment, the client computer program performs actions with the second tokens on the second distributed ledger with a second client private key.

According to another embodiment, a non-transitory computer readable storage medium, including instructions stored thereon, which when read and executed by one or more computer processors, cause the one or more computer processors to perform steps comprising: receiving a first instruction from a client computer program to mint first tokens for a client asset; encumbering the client asset on a custody ledger; creating a balance of the first tokens for the client asset on a first distributed ledger; receiving a second instruction to lock and mint the first tokens to a second distributed ledger as second tokens; receiving verification from a custodian or triparty agent that the first tokens are locked on a lock ledger for the custodian or triparty agent; instructing a blockchain bridge computer program to mint second tokens to a client address on the second distributed ledger; receiving a third instruction to return the second tokens to the first distributed ledger; executing a public burn of the second tokens on the second distributed ledger; and instructing the custodian or triparty agent to unlock the first tokens and move the first tokens to the first distributed ledger.

In one embodiment, the non-transitory computer readable storage medium may also include instructions stored thereon, which when read and executed by one or more computer processors, cause the one or more computer processors to perform steps comprising: receiving a request to redeem the first tokens; and executing a public burn and redeem of the first tokens.

In one embodiment, the first instruction, the second instruction, and/or the third instruction are signed with a first private client key.

In one embodiment, the balance of first tokens may be created with a first tokenization agent private key.

In one embodiment, the instruction to mint second tokens, the instruction to unlock, and/or the public burn and redeem are signed with a second tokenization agent private key.

In one embodiment, the client computer program performs actions with the second tokens on the second distributed ledger with a second client private key.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments relate to systems and methods for tokenizing assets via blockchain-to-blockchain bridge using underlying assets held at a triparty agent or custodian.

Embodiments are directed to methods for tokenizing regular-way assets, and bridging the tokenized regular-way assets from a permissioned network to public network, from a permissioned network to another permissioned network, from a public network to a permissioned network, and from a public network to another public network.

Embodiments may unlock the potential of smart contracts to create securities tokens representing stocks, bonds, or other liability instruments, and move or transfer of these assets to a blockchain-based networks. This allows entities to trust data events and data sources of third parties.

In embodiments, a tokenized asset may be transferred to other parties that are not clients of the issuing custodian and may operate on an open blockchain, subject to the issuer complying with applicable rules.

In embodiments, regular-way assets may "live" as asset tokens on blockchain network and may be interoperable across them. This may enable regular-way assets to benefit from constructs built for "decentralized finance" ("DeFi"), such as automatic market makers and lending facilities that enforce "smart contract" business logic. This may help enhance the efficiency, affordability, and accessibility of financial services. For specific assets, this mechanism may also increase trade liquidity and hasten effective price discovery. Finally, this mechanism may enhance economic inclusion by enabling more parties to participate in capital markets.

The disclosure of U.S. Provisional Patent Application Ser. No. 63/379,581, filed Oct. 14, 2022, is hereby incorporated, by reference, in its entirety.

In embodiments, an asset, such as currency, a physical asset, a virtual asset, etc. may be minted on a first blockchain (e.g., Blockchain A) as asset token(s). A computer program, such as a blockchain bridge computer program, may lock the asset token(s) for the asset on the first blockchain and may then mint asset tokens on a second blockchain (e.g., Blockchain B). Certain operations may be performed on the asset tokens on the second blockchain. After the conclusion of those operations, the blockchain bridge computer program may burn, revoke, or invalidate the asset tokens on the second blockchain, and may then unlock the asset tokens on the first blockchain. The asset token on the first blockchain may then be redeemed.

Figure 1:
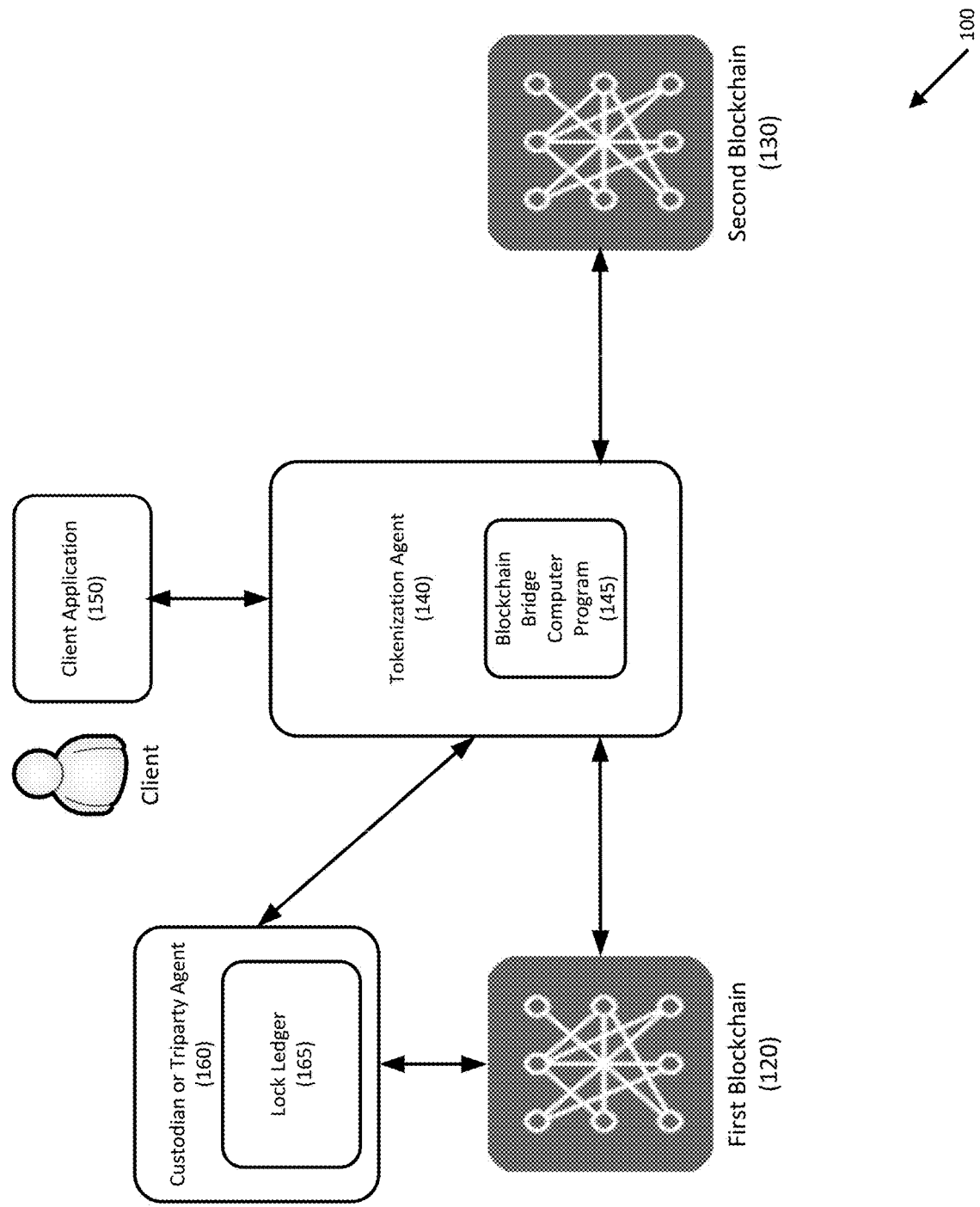
FIG. 1 illustrates a system for tokenizing assets via blockchain-to-blockchain bridge using underlying assets held at a triparty agent or custodian according to an embodiment.

Referring to FIG. 1, a system for tokenizing assets via blockchain-to-blockchain bridge using underlying assets held at a triparty agent or custodian is provided according to an embodiment. System 100 may include tokenization agent 140, which may be provided on an electronic device (not shown), such as a server (e.g., physical and/or cloud based), computer, etc. Tokenization agent 140 may execute blockchain bridge computer program 145. Blockchain bridge computer program 145 may interface with a plurality of blockchain-based networks (e.g., first blockchain 120 and second blockchain 130). Although two blockchains networks are depicted in FIG. 1, it should be recognized that additional blockchain networks may be provided as is necessary and/or desired.

Tokenization agent 140 may further interface with custodian or triparty agent 160. Custodian or triparty agent 160 may maintain lock ledger 165, on which asset tokens may be escrowed, ringfenced, or otherwise prevented from being accessed or manipulated by the client.

Client assets may be tokenized by tokenization agent 140 and moved to lock ledger 165, where they may be escrowed or ringfenced.

Client application 150 may receive instructions from a client to move assets from first blockchain 120 to second blockchain 130. Client application 150 may be executed on any suitable client electronic device (not shown), including computer, smart devices, etc.

In embodiments, several cryptographic private key accounts may be used for asset-tokenization related private key interactions. An illustrative set-up is as follows:

For example, keys "0x1" and "0x2" may be provided for the technical operator (e.g., one for Blockchain A and one for Blockchain B). These may be used to grant and revoke roles to other accounts. These keys may also pause and un-pause the contracts.

Keys "0x3" and "0x4" may be provided to the tokenization agent (e.g., one for Blockchain A and one for Blockchain B). Upon instruction, key 0x3 may be used to mint/burn asset tokens on Blockchain A, and upon instruction, key 0x4 may be used to mint/burn asset tokens on Blockchain B.

Key "0x5" may be used to lock the account under remittance of the triparty agent or custodian (e.g., one for Blockchain A). This is used by the triparty agent or custodian in its function as the designated custodian of locked assets.

Keys "0x6" and "0x7" may be assigned to the client (e.g., one for Blockchain A and one for Blockchain B). These keys may be used to move asset tokens to lock-and-mint from Blockchain A net to Blockchain B, to use asset tokens for various purposes on Blockchain B, and to move asset tokens on Blockchain A for redemption.

Figure 2:
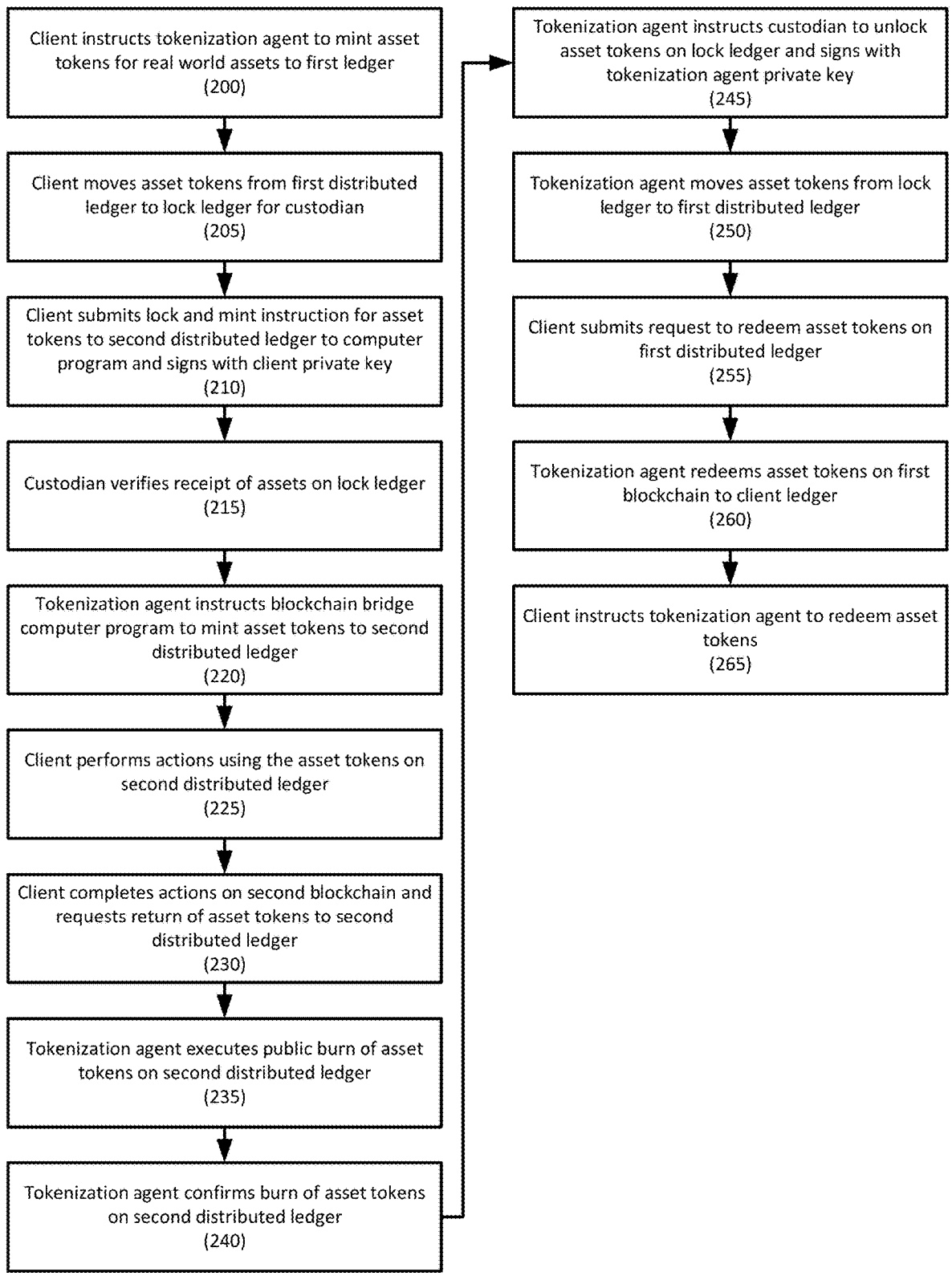
FIG. 2 illustrates a method for tokenizing assets via blockchain-to-blockchain bridge using underlying assets held at a triparty agent or custodian according to another embodiment.

Referring to FIG. 2, a method for tokenizing assets via blockchain-to-blockchain bridge using underlying assets held at a triparty agent or custodian is provided according to an embodiment.

In step 200, using a client application, a client may instruct a tokenization agent to mint asset tokens for the client's real world assets to a first distributed ledger, such as a blockchain ledger. The tokenization agent may encumber the underlying asset in a custody ledger, and may, using key 0x3, create an asset token balance on the first distributed ledger.

In step 205, the client may, using key 0x6, cause asset tokens from first distributed ledger to move to a lock ledger for a custodian or triparty agent.

In step 210, the client may submit an instruction to the tokenization agent to a lock and mint instruction the asset tokens to a second distributed ledger and may sign the instruction with a client private key, such as key 0x6.

In step 215, the custodian or triparty agent may verify that the asset tokens are locked on the lock ledger.

In step 220, the tokenization agent may, using key 0x4, instruct the blockchain bridge computer program to mint asset tokens to a client address on the second distributed ledger.

In step 225, the client may, using key 0x7, perform actions using the tokens on the second blockchain.

In step 230, when complete, the client may, using key 0x7, request the tokenization agent return the asset tokens to the second distributed ledger.

In step 235, the tokenization agent may, using key 0x4, execute a public burn of the asset tokens on the second distributed ledger.

In step 240, the tokenization agent may confirm the burn of the asset tokens on the second distributed ledger.

In step 245, the tokenization agent may instruct the custodian or triparty agent to unlock the asset tokens on the lock ledger. The tokenization agent may sign the instruction with the tokenization agent private key, such as key 0x3.

In step 250, the custodian or triparty agent may, using key 0x5 move the asset tokens from the lock ledger to the first distributed ledger.

In step 255, the client may, using key 0x6, submit a request to redeem asset tokens on the first distributed ledger. The request may be made to the client application.

In step 260, the tokenization agent may, using key 0x3, publicly burn and redeem the asset tokens on first blockchain to the client ledger.

In step 265, using the client application, the client may instruct the tokenization agent to redeem the asset tokens. The tokenization agent may unencumber the asset tokens and may sign the instruction with key 0x3.

Figure 3:
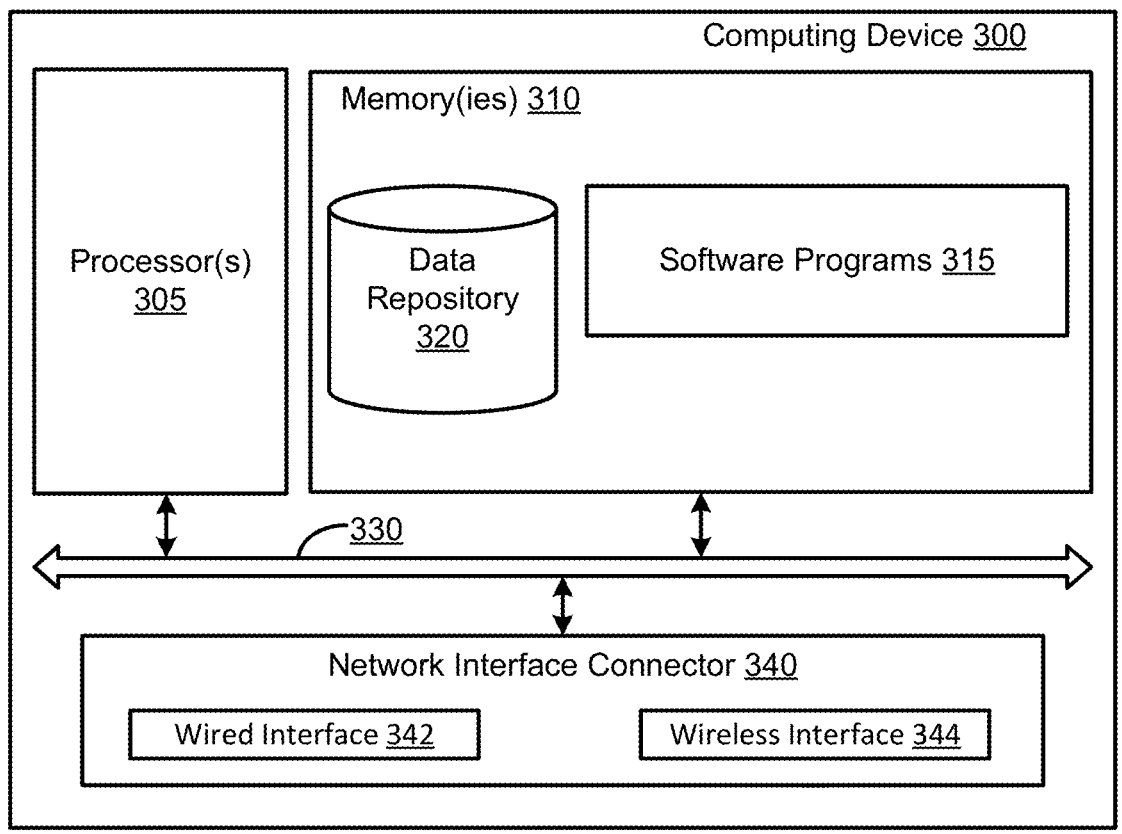
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope. Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, implemented using one or more computer processors, for tokenizing assets via a blockchain-to-blockchain bridge using underlying assets held at a triparty agent or custodian, the method comprising:
   receiving, at a tokenization agent computer program, a first instruction from a client computer program to mint first tokens for a client asset;
   encumbering, by the tokenization agent computer program, the client asset on a custody ledger;
   creating, by the tokenization agent computer program, a balance of the first tokens for the client asset on a first distributed ledger;
   receiving, by the tokenization agent computer program, a second instruction to lock and mint the first tokens to a second distributed ledger as second tokens;
   receiving, by the tokenization agent computer program, verification from a custodian or triparty agent that the first tokens are locked on a lock ledger for the custodian or triparty agent;
   instructing, by the tokenization agent computer program, a blockchain bridge computer program to mint second tokens to a client address on the second distributed ledger;
   pausing, by a cryptographic private key, a contract between a first blockchain and a second blockchain;
   unpausing, by the cryptographic private key, the contract between the first blockchain and the second blockchain;
   receiving, by the tokenization agent computer program, a third instruction to return the second tokens to the first distributed ledger;
   executing, by the tokenization agent computer program, a public burn of the second tokens on the second distributed ledger; and
   instructing, by the tokenization agent computer program, the custodian or triparty agent to unlock the first tokens and move the first tokens to the first distributed ledger.

2. The method of claim 1, further comprising:
   receiving, by the tokenization agent computer program, a request to redeem the first tokens; and
   executing, by the tokenization agent computer program, a public burn and redeem of the first tokens.

3. The method of claim 1, wherein the first instruction, the second instruction, and/or the third instruction are signed with a first private client key.

4. The method of claim 1, wherein the balance of first tokens is created with a first tokenization agent private key.

5. The method of claim 1, wherein the instruction to mint second tokens, the instruction to unlock, and/or the public burn and redeem are signed with a second tokenization agent private key.

6. The method of claim 1, wherein the client computer program performs actions with the second tokens on the second distributed ledger with a second client private key.

7. A system, comprising: a client electronic device comprising one or more computer processors executing a client computer program stored in a memory;
   a custody ledger;
   a custodian or triparty agent comprising a lock ledger;
   a first distributed ledger;
   a second distributed ledger;
   a blockchain bridge computer program in communication with the first distributed ledger, and the second distributed ledger; and
   a tokenization agent computer program that is configured to receive a first instruction from the client computer program to mint first tokens for a client asset, to encumber the client asset on the custody ledger, to create a balance of the first tokens for the client asset on a first distributed ledger, to receive a second instruction to lock and mint the first tokens to a second distributed ledger as second tokens, to receive verification from the custodian or triparty agent that the first tokens are locked on the lock ledger, to instruct the blockchain bridge computer program to mint second tokens to a client address on the second distributed ledger, to receive a third instruction to return the second tokens to the first distributed ledger, to execute a public burn of the second tokens on the second distributed ledger, to instruct the custodian or triparty agent to unlock the first tokens and move the first tokens to the first distributed ledger, to pause a contract between a first blockchain and a second blockchain, and to un-pause the contract between the first blockchain and the second blockchain.

8. The system of claim 7, wherein the tokenization agent computer program is further configured to request a redeem the first tokens to execute a public burn and redeem of the first tokens.

9. The system of claim 7, wherein the first instruction, the second instruction, and/or the third instruction are signed with a first private client key.

10. The system of claim 7, wherein the balance of first tokens is created with a first tokenization agent private key.

11. The system of claim 7, wherein the instruction to mint second tokens, the instruction to unlock, and/or the public burn and redeem are signed with a second tokenization agent private key.

12. The system of claim 7, wherein the client computer program performs actions with the second tokens on the second distributed ledger with a second client private key.

13. A non-transitory computer readable storage medium, including instructions stored thereon, which when read and executed by one or more computer processors, cause the one or more computer processors to perform steps comprising:
   receiving a first instruction from a client computer program to mint first tokens for a client asset;
   encumbering the client asset on a custody ledger;
   creating a balance of the first tokens for the client asset on a first distributed ledger;
   receiving a second instruction to lock and mint the first tokens to a second distributed ledger as second tokens;

receiving verification from a custodian or triparty agent that the first tokens are locked on a lock ledger for the custodian or triparty agent;

instructing a blockchain bridge computer program to mint second tokens to a client address on the second distributed ledger;

receiving a third instruction to return the second tokens to the first distributed ledger;

pausing, by a cryptographic private key, a contract between a first blockchain and a second blockchain;

unpausing, by the cryptographic private key, the contract between the first blockchain and the second blockchain;

executing a public burn of the second tokens on the second distributed ledger; and instructing the custodian or triparty agent to unlock the first tokens and move the first tokens to the first distributed ledger.

14. The non-transitory computer readable storage medium of claim 13, further including instructions stored thereon, which when read and executed by one or more computer processors, cause the one or more computer processors to perform steps comprising:

receiving a request to redeem the first tokens; and
executing a public burn and redeem of the first tokens.

15. The non-transitory computer readable storage medium of claim 13, wherein the first instruction, the second instruction, and/or the third instruction are signed with a first private client key.

16. The non-transitory computer readable storage medium of claim 13, wherein the balance of first tokens is created with a first tokenization agent private key.

17. The non-transitory computer readable storage medium of claim 13, wherein the instruction to mint second tokens, the instruction to unlock, and/or the public burn and redeem are signed with a second tokenization agent private key.

18. The non-transitory computer readable storage medium of claim 13, wherein the client computer program performs actions with the second tokens on the second distributed ledger with a second client private key.

* * * * *